United States Patent [19]
Voss et al.

[11] Patent Number: 5,519,987
[45] Date of Patent: May 28, 1996

[54] COMBINE HARVESTER

[75] Inventors: Lothar Voss, Neustadt; Christian Noack, Guttau; Klaus Eckert, Neusalza-Spremberg; Volker Windisch, Obergurig; Wolf-Carsten Löbel, Malschwitz, all of Germany

[73] Assignee: MDW Madhrescherwerke GmbH, Singwitz, Germany

[21] Appl. No.: 381,722

[22] Filed: Feb. 1, 1995

[30] Foreign Application Priority Data

Feb. 19, 1994 [DE] Germany .......................... 44 05 337.1

[51] Int. Cl.$^6$ ..................................................... A01F 7/04
[52] U.S. Cl. ............................................. 56/14.6; 460/83
[58] Field of Search .................................. 56/14.6, 14.5; 460/83, 69, 75, 76

[56] References Cited

U.S. PATENT DOCUMENTS

| | | | |
|---|---|---|---|
| 4,712,568 | 12/1987 | Strong . | |
| 4,739,774 | 4/1988 | Heidjann | 56/14.6 X |
| 4,906,219 | 3/1990 | Matousek | 460/98 |

FOREIGN PATENT DOCUMENTS

| | | |
|---|---|---|
| 384708 | 6/1987 | Austria . |
| 3325951 | 1/1985 | Germany . |
| 3515451 | 10/1986 | Germany . |
| 4023894 | 2/1991 | Germany . |
| 294621 | 10/1991 | Germany . |

*Primary Examiner*—Terry Lee Melius
*Attorney, Agent, or Firm*—Herbert Dubno; Andrew Wilford

[57] ABSTRACT

An automotive combine has a frame adapted to move in a travel direction along the ground, a front housing pivotal on the frame, and a cutter releasably mounted on the front housing for cutting standing crop. A main thresher on the pivotal front housing has a front input and a rear outlet for taking in the cut standing crop at the input, threshing it, and outputting it at the outlet as a kernel-rich stream and a separate chaff stream. A blower conveyor on the frame has an intake receiving the kernel-rich stream and an output provided with a conduit for blowing the kernel-rich stream from the outlet. A grain bin is mounted on the machine frame and a sieve on the frame underneath the outlet of the blower separates kernels from chaff in the kernel-rich stream and delivers the kernels to the grain bin while depositing the chaff on the ground outside the combine.

14 Claims, 3 Drawing Sheets

COMBINE HARVESTER

FIELD OF THE INVENTION

The present invention relates to a combine harvester. More particularly this invention concerns an automotive machine that cuts a standing grain crop and that threshes the cut crop.

BACKGROUND OF THE INVENTION

A standard automotive combine harvester has a frame on whose front end is provided a standing crop cutter, and which also includes a threshing system for the cut standing crop. Such a machine normally cuts the standing crop, for instance wheat, threshes the kernels off the stalks, deposits the kernels on a grain bin on the machine, and spreads the stalks as chopped chaff on the field behind the machine.

In German patent 4,023,894 published 28 Feb. 1991 an axial throughput threshing device is mounted parallel to the machine's longitudinal axis. This threshing device delivers a kernel-rich stream to a following separating system that gets substantially all the chaff off the kernels and deposits the kernels in the grain bin. The threshing and separating drums are mounted between the cutter and the final kernel-cleaning system on a housing that can move in a vertical plane relative to the combine frame between the front wheels. Underneath the threshing drums are several auger conveyors that extend back to the cleaning device.

The capacity of such a combine is limited by the amount of material the threshing subsystem can handle. The capacity of this subsystem is inherently limited so the machine must move at low speed to avoid overloading the threshing device.

OBJECTS OF THE INVENTION

It is therefore an object of the present invention to provide an improved automotive harvesting combine.

Another object is the provision of such an improved automotive harvesting combine which overcomes the above-given disadvantages, that is which has a very high capacity and that cleans the kernels very thoroughly.

SUMMARY OF THE INVENTION

An automotive combine has according to the invention a frame adapted to move in a travel direction along the ground, a front housing pivotal on the frame, and a cutter releasably mounted on the front housing for cutting standing crop. A main thresher on the pivotal front housing has a front input and a rear outlet for taking in the cut standing crop at the input, threshing it, and outputting it at the outlet as a kernel-rich stream and a separate chaff stream. A blower conveyor on the frame has an intake receiving the kernel-rich stream and an output provided with a conduit for blowing the kernel-rich stream from the outlet. A grain bin is mounted on the machine frame and a sieve on the frame underneath the outlet of the blower separates kernels from chaff in the kernel-rich stream and delivers the kernels to the grain bin while depositing the chaff on the ground outside the combine.

Such an arrangement of subsystems makes it possible for the machine to have a very great throughput. The crop is cut and then passed through the main thresher to the separator sieve in such a manner that a very great amount of material can be accommodated. The machine produces very clean grain, while redepositing the chaff, if desired, right in the row it was taken from. The provision of the thresher directly at the cutter ensures that most of the stalks and other material constituting the unwanted chaff are separated from the material flow right away and therefore do not burden the downstream subsystems. The use of an air conveyor that feeds the material to the sieve means that a further elimination of most residual chaff is effected before the material stream gets to the sieve. The compact design of the machine makes it possible for it to travel on a standard roadway and, indeed, according to the invention the system is set up for rear-wheel-only drive when traveling the highway and four-wheel arise when in the field.

According to a feature of the invention the frame is provided with an open port underneath the rear outlet of the thresher for passing the chaff stream directly out of the combine. Thus the material outputted by the thresher can be dumped directly back into the field. This system is used with a crop that can be easily threshed.

According to another feature of the invention, usable with a crop that takes more work to thresh, an intermediate thresher is provided on the frame for receiving the chaff stream from the main thresher and separating kernels from the chaff stream and feeding the separated kernels to the blower intake while ejecting the rest of the chaff stream from the combine onto the ground. Such an intermediate thresher includes a transversely extending rotatable drum formed with external ridges and defining a central intake and a pair of end outputs flanking the central intake, and a casing having a perforated lower portion spacedly surrounding the drum and formed internally with ridges angled such that on rotation of the drum crop fed to the central intake is moved outward to the end outputs while kernels in the chaff stream pass through the perforated lower portion.

To further process the chaff, the drum is provided on its ends with means for chopping the chaff at the end outputs. In addition the frame is provided at each end of the drum with means for spreading the chaff chopped by the chopper of the drum ends. Thus the chaff is comminuted so that when plowed under it will decompose rapidly.

In accordance with this invention the frame forms immediately above the sieve a rearwardly open sieving compartment. The blower output opens rearwardly at a front edge of the compartment so that chaff in the kernel-rich stream is blown out the compartment and kernels therein fall onto the sieve. The blower is located on the frame below the rear outlet of the main thresher. The compartment is well above and behind the thresher, and the conduit extends back and up from the blower to the compartment.

The sieve according to this invention includes a plurality of sieve plates spaced horizontally above one another underneath the compartment. One of these plates vibrates. The grain bin is above the sieving compartment and has a lower wall forming a ceiling of the sieving compartment. In addition the combine has a centrally split transverse auger underneath the rear output of the thresher and extending to the blower intake.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
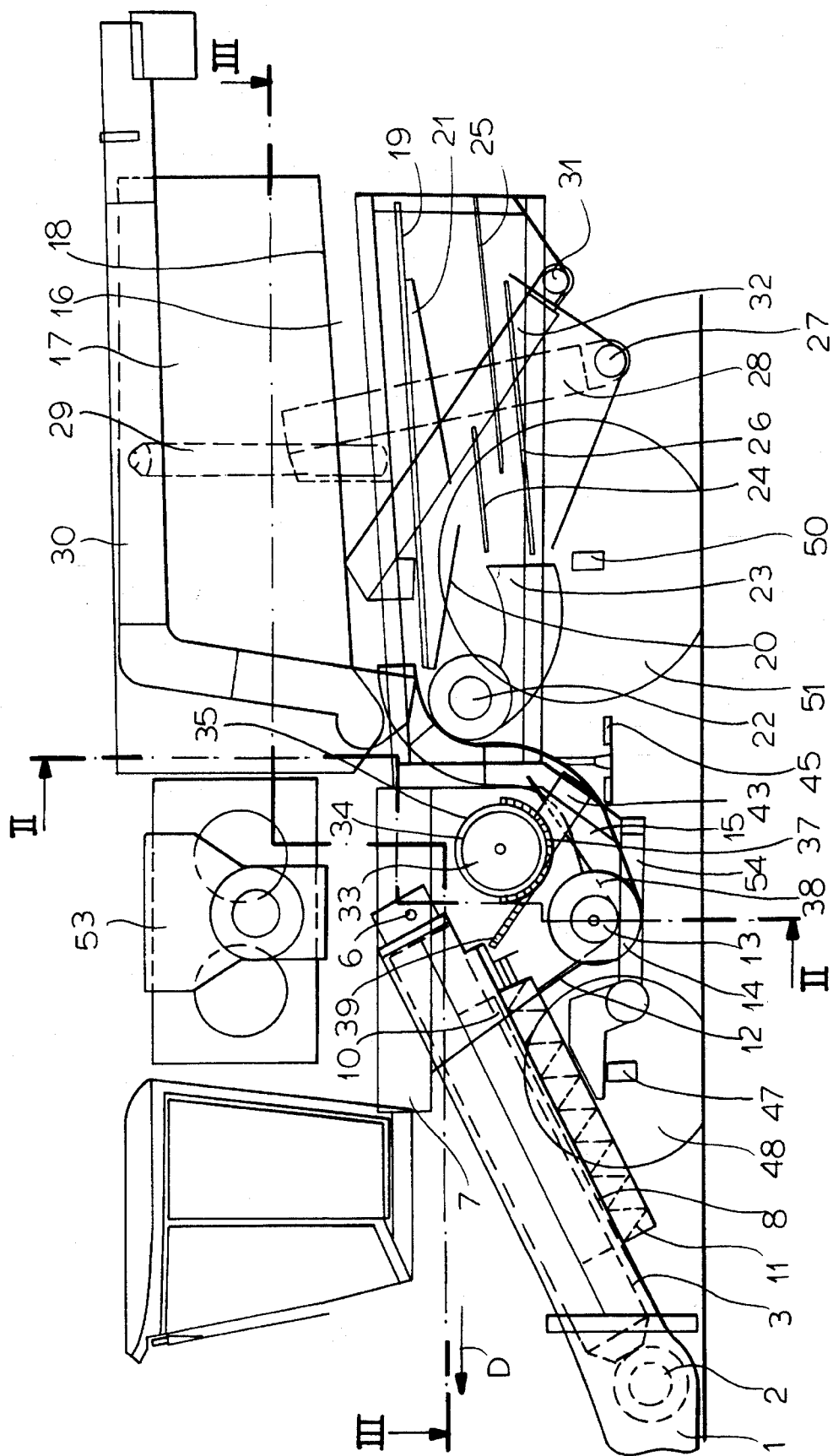
FIG. 1 is a side view partly in vertical section through the combine of this invention.
Figure 2:
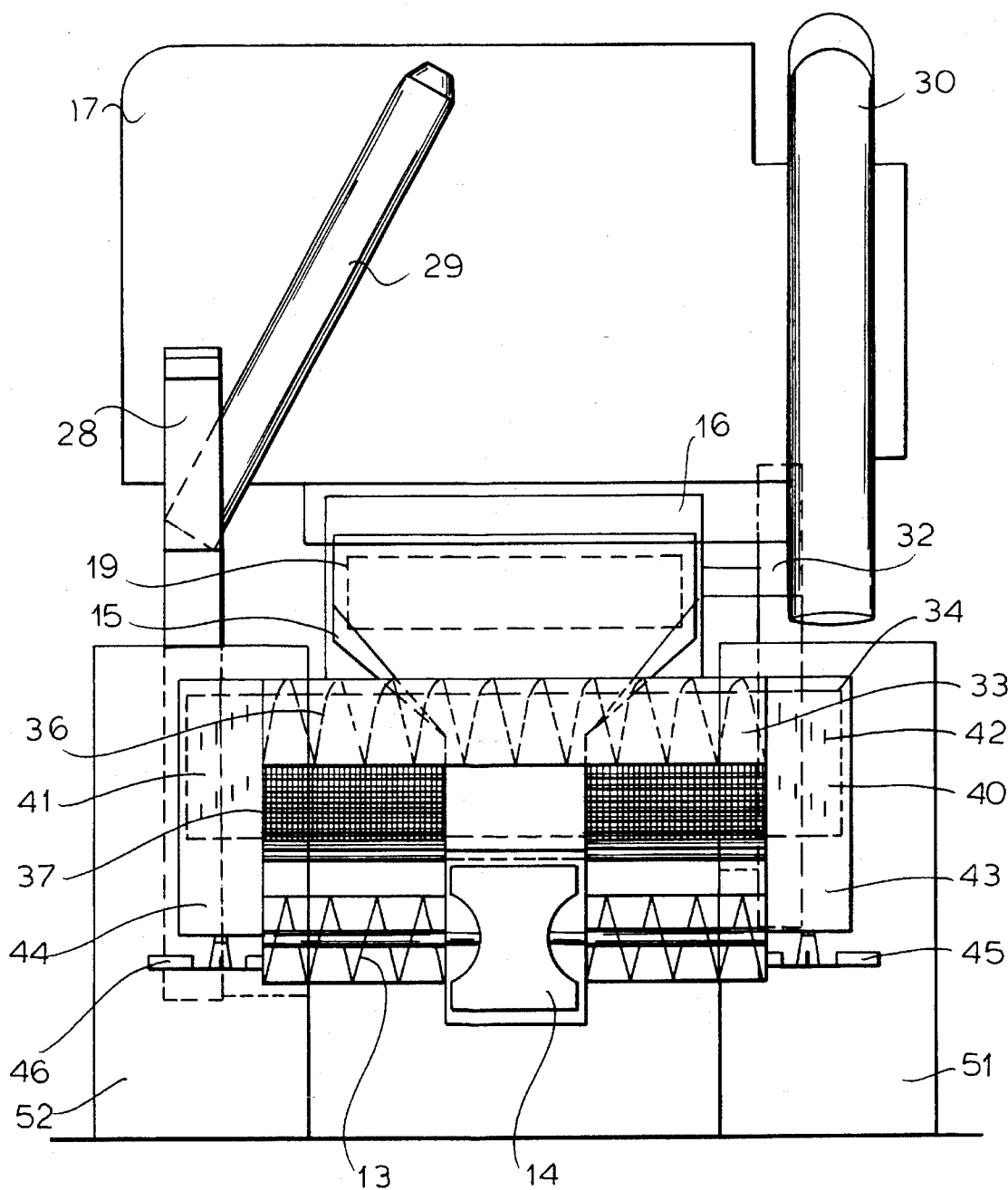
FIGS. 2 and 3 are sections taken respectively along lines II—II and III—III of FIG. 1.
Figure 3:
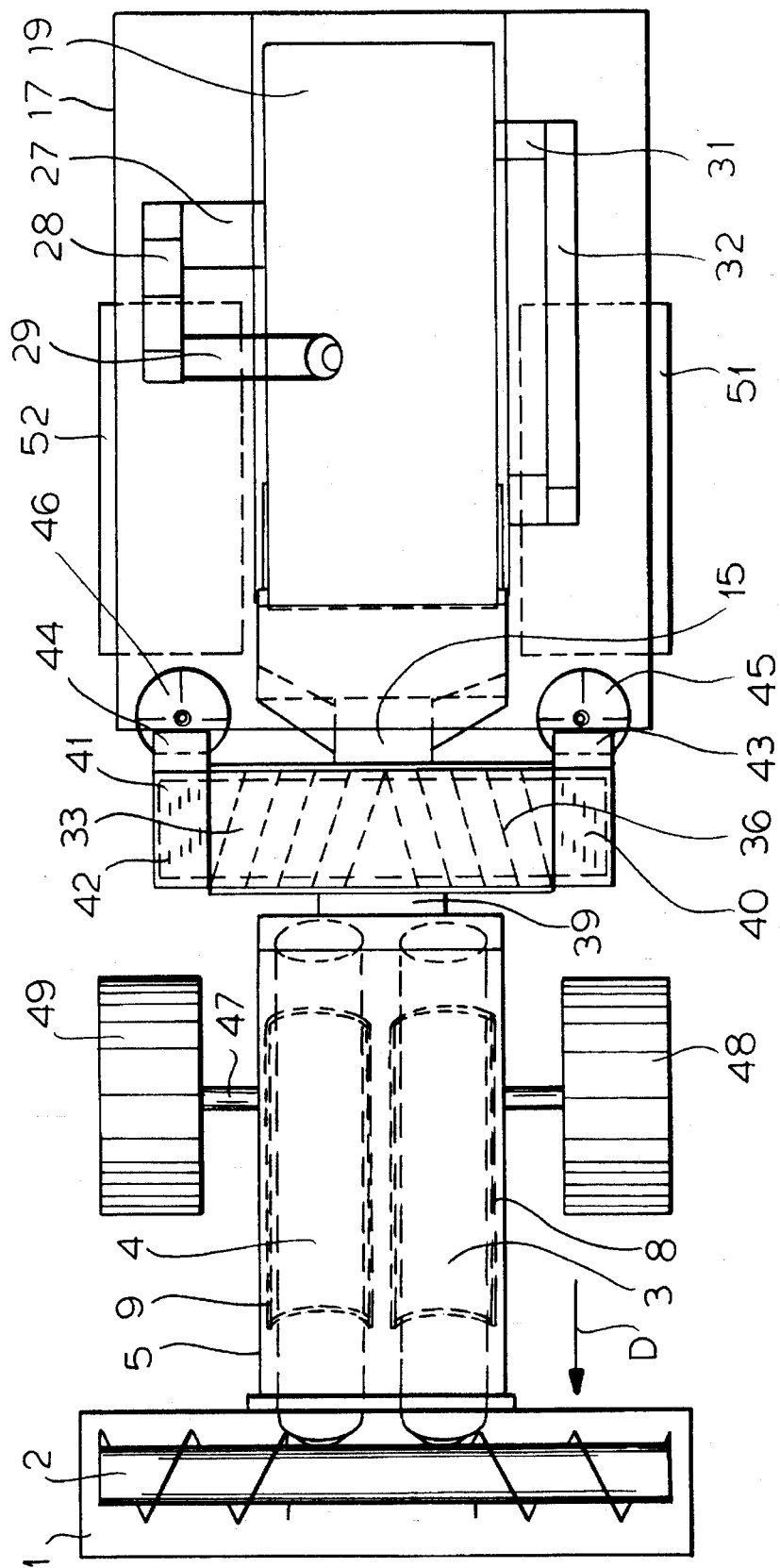

As seen in the drawing an axial-throughflow combine has a front-mounted cutter 1 that severs standing crop at the base and feeds it to a transverse conveyor 2 that moves the cut crop transversely of a horizontal travel direction D to a thresher comprised of two longitudinally extending threshing- and separating drums 3 and 4. A common housing 5 pivotal about a transverse axis 6 on a frame 7 of the combine holds the drums 3 and 4 and the unillustrated rotary drive shaft for these drums 3 and 4 is centered on this axis 6 so the housing 5 can pivot about the axis 6 without affecting force transmission to the drums 3 and 4. The cutter 1 can be removed from the housing 5 and its vertical position can be set by unillustrated hydraulic cylinders braced between the housing 7 and the housing 5.

The cut crop is threshed as it moves back in the direction D between the drums and threshing baskets 8 and 9 surrounding them and defining with them annular spaces 10. The mixture of grain kernels, chaff, and straw crops down into auger conveyors 11 extending underneath the drums 3 and 4 and feeding the mixture back to crop onto a deflector or guide plate 12. Thence the mixture is moved laterally toward the center of the machine by a centrally split conveyor auger 13 to the input of a blower 14 that shoots the mixture back up through a conduit 15 to the leading end of a separating chamber 16. The auger 13 could work oppositely to move the cut-crop mixture out to two such blowers 14 flanking the machine.

The separating chamber 16 has an upper wall 18 formed by the floor of a clean-grain bin or tank 17 atop the machine and a lower wall 19 constituted as a vibrating screen or sieve. The chaff and light fraction of the cut-crop mixture is simply blown out the rearwardly open end of the chamber 16, to fall back down onto the field in the same row it was originally cut from for subsequent plowing under.

The kernels in the cut-crop mixture fall through the floor 19 and are deflected by angled guide plates 20 and 21 to fall on several angled screens 24, 25, and 26. Another blower 22 has an outlet 23 that blows over the screens 24, 25, and 26 so that any remaining light material will be separated from the grain kernels and will be blown out the back of the machine. A rotary separator could be used. In any case the relatively clean kernels will crop down into to be collected by another conveyor auger 27 that feeds them via an elevator 28 and distributing tube 29 to the grain bin 17 that may be emptied into an adjacent truck by an output chute 30 in the manner well known in the art. The mixture working its way to the rear end of the middle screen 25 is collected by an auger conveyor 31 and fed back up via another elevator to the leading or upstream end of the main screen 19 for rescreening.

The mainly chaff mixture exiting from the trailing ends of the two spaces 10 defined between the drums 3 and 4 and their respective baskets 8 and 9 is fed via a sift plate 39 to the central intake of a separator 33. Any kernels in this flow will pass through the plate 39 and crop down directly into the transverse grain conveyor 13. The transverse separator 33 has a driven peripherally ridged drum 34 whose upper region is covered by a semicylindrical casing 35 whose inner wall in turn is formed with helical conveyor ribs 36. The lower region of the drum 34 is surrounded by a separating basket or mesh 37 underneath of which is an angled guide plate 38 that also extends to the intake of the auger conveyor 13. Thus any kernels that get into the spaces 10 will be fed back into the main flow to be separated out in the chamber 16.

The pitch of the drum ribs 36 and the rotation direction of the drum 34 are such that the material fed tangentially in between the drum 34 and the surrounding housing-forming parts 35 and 37 is moved transversely outward from the center. The ends of the drum are provided with choppers 40 and 41 having blades 42. Unillustrated blades on hinged flaps cooperate with the rotating blades 42 to comminute the material. Thus the choppers 40 and 41 chop the material fed to them and crop it via outlet chutes or conduits 43 and 44 onto spreader disks 45 and 46 flanking the machine and rotatable about respective vertical axes. Depending on the rotation direction of these spreaders 45 and 46 the chopped material is flung from the side of the machine, or strewed underneath the machine. The unillustrated hinged flaps carrying the unillustrated blades can pivot back to let unchopped material pass to prevent the machine from jamming, and the choppers 40 and 41 as well as the spreaders 45 and 46 can if desired be separately driven from the drum 34 and other machine elements.

It is also possible, when the crop is of the type that can be easily threshed, to do away with the separator 33, choppers 40 and 41, and spreaders 45 and 46 and simply provide the frame 1 with an openable door 54 that can form an outlet port underneath the rear ends of the drums 3 and 4. Thus the material exiting from the spaces 10 will be dumped directly onto the field in the same row it was cut from.

The machine itself has a pivoting front axle 47 carrying front wheels 48 and 49 and a fixed rear axle 50 carrying rear wheels 51 and 52. An engine 53 atop the frame 7 powers the equipment. The wheels 48, 49, 51, and 52 are all driven when off road, that is in the field, but for highway travel of the machine the drive to the front wheels 48 and 49 is uncoupled and only the rear wheels 51 and 52 are driven by the engine 53.

In summary, the machine operates as follows as it is moved forward in the direction D along a swath or row of standing crop:

The crop is cut by the front-mounted cutter 1 and fed via the conveyor 2 to the intake of the thresher housing 5. It is moved backward between the drums 3 and 4 and their surrounding mesh baskets or housings 8 and 9 so that the bulk of the kernels is separated from the cut crop and crops down into the conveyor 11 that delivers it via the plate 12 to the blower 14.

The partially threshed mixture that exits the rear ends of the spaces 10 around the drums 3 and 4 is cropped onto the sieve plate 39 so that some of the remaining kernels pass through and are fed to the blower. The rest of the material is then rethreshed in the separator 33 so that virtually all of the remaining kernels pass through the mesh 37 to crop onto the plate 38 and enter the blower 14. The straw and chaff that has been separated from the kernels is comminuted by the choppers 40 and 41 and strewed next to or underneath the machine.

The blower 14 blows the kernel/chaff mixture, which is received from the conveyor 11 and plate 38, via the conduit 15 to the chamber 16 where the heavier kernels fall down on the sieve 19 and the lighter chaff is blown out the open rear end of the chamber 16 into the field. The kernels pass through the plate 19 and are deflected by the plates 20 and 21 to the three further sieve plates 24, 25, and 26 whose front ends are below their rear ends to encourage a forward migration of the kernels. Since the auxiliary blower 22 is creating a crosswise current of air over the downwardly cropping kernels, any remaining chaff or straw will be blow to the upper ends of the screens 24, 25, and 26 to drop down into the conveyor 31 which will recycle them to the upstream end of the plate 19 for reseparation.

The kernels that make their way through the screens 24, 25, and 26 are moved by the conveyor 27 up into the clean-grain compartment 17. These kernels have been subjected at the very least to two major threshing or separating steps, one at the front-thresher drums 3 and 4 and another in the rear sieve area with the screens 19, 24, 25, and 26, and may also have passed through the intermediate separator 33. As a result the kernels are very clean.

We claim:

1. An automotive combine comprising:

a frame adapted to move in a travel direction along the ground;

a front housing pivotal on the frame;

a cutter releasably mounted on the front housing and including means for cutting standing crop;

main threshing means on the pivotal front housing having a front input and a rear outlet for taking in the cut standing crop at the input, threshing it, and outputting it at the outlet as a kernel-rich stream and a separate chaff stream;

means on the frame for receiving the chaff stream ejecting at least a portion of the chaff stream from the combine onto the ground;

conveyor means on the frame including a blower having an intake receiving the kernel-rich stream and an output provided with a conduit positioned for blowing the kernel-rich stream from the outlet;

a grain bin on the frame;

means including a sieve on the frame underneath the outlet of the blower for separating kernels from chaff in the kernel-rich stream and delivering the kernels to the grain bin while depositing the chaff on the ground outside the combine.

2. The combine defined in claim 1 wherein the frame is provided with an open port underneath the rear outlet of the threshing means for passing the chaff stream directly out of the combine.

3. The combine defined in claim 1, further comprising means including an intermediate thresher on the frame receiving the chaff stream from the main threshing means for separating kernels from the chaff stream and feeding the separated kernels to the blower intake.

4. The combine defined in claim 3 wherein the intermediate thresher includes:

a transversely extending rotatable drum formed with external ridges and defining a central intake and a pair of end outputs flanking the central intake, and a casing having a perforated lower portion spacedly surrounding the drum and formed internally with ridges angled such that on rotation of the drum crop fed to the central intake is moved outward to the end outputs while kernels in the chaff stream pass through the perforated lower portion.

5. The combine defined in claim 4 wherein the drum is provided on its ends with means for chopping the chaff at the end outputs.

6. The combine defined in claim 5 wherein the frame is provided at each end of the drum with means for spreading the chaff chopped by the chopping means of the drum ends.

7. The combine defined in claim 1 wherein the frame forms immediately above the sieve a rearwardly open sieving compartment, the blower output opening rearwardly at a front edge of the compartment, whereby chaff in the kernel-rich stream is blown out the compartment and kernels therein fall onto the sieve.

8. The combine defined in claim 7 wherein the blower is located on the frame below the rear outlet of the main threshing means, the compartment is well above and behind the threshing means, and the conduit extends back and up from the blower to the compartment.

9. The combine defined in claim 7 wherein the sieve includes a plurality of sieve plates spaced horizontally above one another underneath the compartment.

10. The combine defined in claim 7 wherein the sieve includes at least one vibrating sieve plate.

11. The combine defined in claim 7 wherein the grain bin is above the sieving compartment and has a lower wall forming a ceiling of the sieving compartment.

12. The combine defined in claim 1, further comprising:

a centrally split transverse auger underneath the rear output of the threshing means and extending to the blower intake.

13. The combine defined in claim 1, further comprising steerable front wheels on the frame;

unsteerable back wheels on the frame; and an engine on the frame connected to the back wheels for advancing the combine along the ground.

14. The combine defined in claim 13 wherein the engine can also drive the front wheels.

\* \* \* \* \*